United States Patent
Kondo et al.

(10) Patent No.: US 12,461,199 B2
(45) Date of Patent: Nov. 4, 2025

(54) AXIAL MISALIGNMENT ESTIMATION APPARATUS

(71) Applicant: DENSO CORPORATION, Kariya (JP)

(72) Inventors: Katsuhiko Kondo, Nisshin (JP); Takuya Takayama, Kariya (JP)

(73) Assignee: DENSO CORPORATION, Kariya (JP)

( * ) Notice: Subject to any disclaimer, the term of this patent is extended or adjusted under 35 U.S.C. 154(b) by 462 days.

(21) Appl. No.: 18/163,778

(22) Filed: Feb. 2, 2023

(65) Prior Publication Data
US 2023/0176186 A1    Jun. 8, 2023

Related U.S. Application Data

(63) Continuation of application No. PCT/JP2021/028613, filed on Aug. 2, 2021.

(30) Foreign Application Priority Data

Aug. 6, 2020 (JP) .................................. 2020-133860

(51) Int. Cl.
*G01S 13/72* (2006.01)
*G01S 7/40* (2006.01)
*G01S 13/931* (2020.01)

(52) U.S. Cl.
CPC ............ *G01S 7/4021* (2013.01); *G01S 13/72* (2013.01); *G01S 13/931* (2013.01)

(58) Field of Classification Search
CPC .. G01S 13/72; G01S 13/931; G01S 2013/932; G01S 7/4021; G01S 7/403; G01S 7/4034
See application file for complete search history.

(56) References Cited

U.S. PATENT DOCUMENTS

| 2019/0033442 A1* | 1/2019 | Millar .................... G01S 13/931 |
| 2019/0219673 A1 | 7/2019 | Morinaga et al. |
| 2020/0103515 A1* | 4/2020 | Kishigami ............ G01S 13/343 |

FOREIGN PATENT DOCUMENTS

JP    2002-228749 A    8/2002

* cited by examiner

*Primary Examiner* — Timothy A Brainard
(74) *Attorney, Agent, or Firm* — Maschoff Brennan

(57) ABSTRACT

An axial misalignment estimation apparatus calculates a first estimated speed ratio that is an estimated speed ratio calculated using an orientation angle that is corrected based on an axial misalignment angle estimated in measurement cycles up to a previous measurement cycle, and calculates at least one second estimated speed ratio that is the first estimated speed ratio presuming aliasing is present at the orientation angle. The axial misalignment estimation apparatus determines, for each stationary reflection point, whether aliasing is present at the orientation angle of the stationary reflection point based on the first estimated speed ratio and the at least one second estimated speed ratio, and corrects the orientation angle of the stationary reflection point in which aliasing is determined to be present, and estimates the axial misalignment angle based on the corrected orientation angle for the stationary reflection point of which the orientation angle is corrected.

12 Claims, 9 Drawing Sheets

AXIAL MISALIGNMENT ESTIMATION APPARATUS

CROSS-REFERENCE TO RELATED APPLICATION

The present application is a continuation application of International Application No. PCT/JP2021/028613, filed on Aug. 2, 2021, which claims priority to Japanese Patent Application No. 2020-133860, filed on Aug. 6, 2020. The contents of these applications are incorporated herein by reference in their entirety.

BACKGROUND

Technical Field

The present disclosure relates to a technology for estimating an axial misalignment angle of a radar apparatus.

Related Art

A radar apparatus that is mounted to a moving body and detects a plurality of reflection points by receiving reflected waves of irradiation waves that are irradiated at every measurement cycle set in advance is known. In this type of radar apparatus, axial misalignment that is a state in which a reference direction of the radar apparatus is shifted from a reference direction of the moving body that is prescribed based on design may occur as a result of a setup state changing for some reason. When axial misalignment occurs, detection error increases, and a position of an object and the like may be erroneously detected.

SUMMARY

One aspect of the present disclosure provides an axial misalignment estimation apparatus that estimates an axial misalignment angle of a radar apparatus that is mounted to a moving body. The axial misalignment estimation apparatus calculates a first estimated speed ratio that is an estimated speed ratio calculated using an orientation angle that is corrected based on an axial misalignment angle estimated in measurement cycles up to a previous measurement cycle, and calculates at least one second estimated speed ratio that is the first estimated speed ratio presuming aliasing is present at the orientation angle. The axial misalignment estimation apparatus determines, for each stationary reflection point, whether aliasing is present at the orientation angle of the stationary reflection point based on the first estimated speed ratio and the at least one second estimated speed ratio, and corrects the orientation angle of the stationary reflection point in which aliasing is determined to be present, and estimates the axial misalignment angle based on the corrected orientation angle for the stationary reflection point of which the orientation angle is corrected.

DESCRIPTION OF THE EMBODIMENTS

Figure 1:
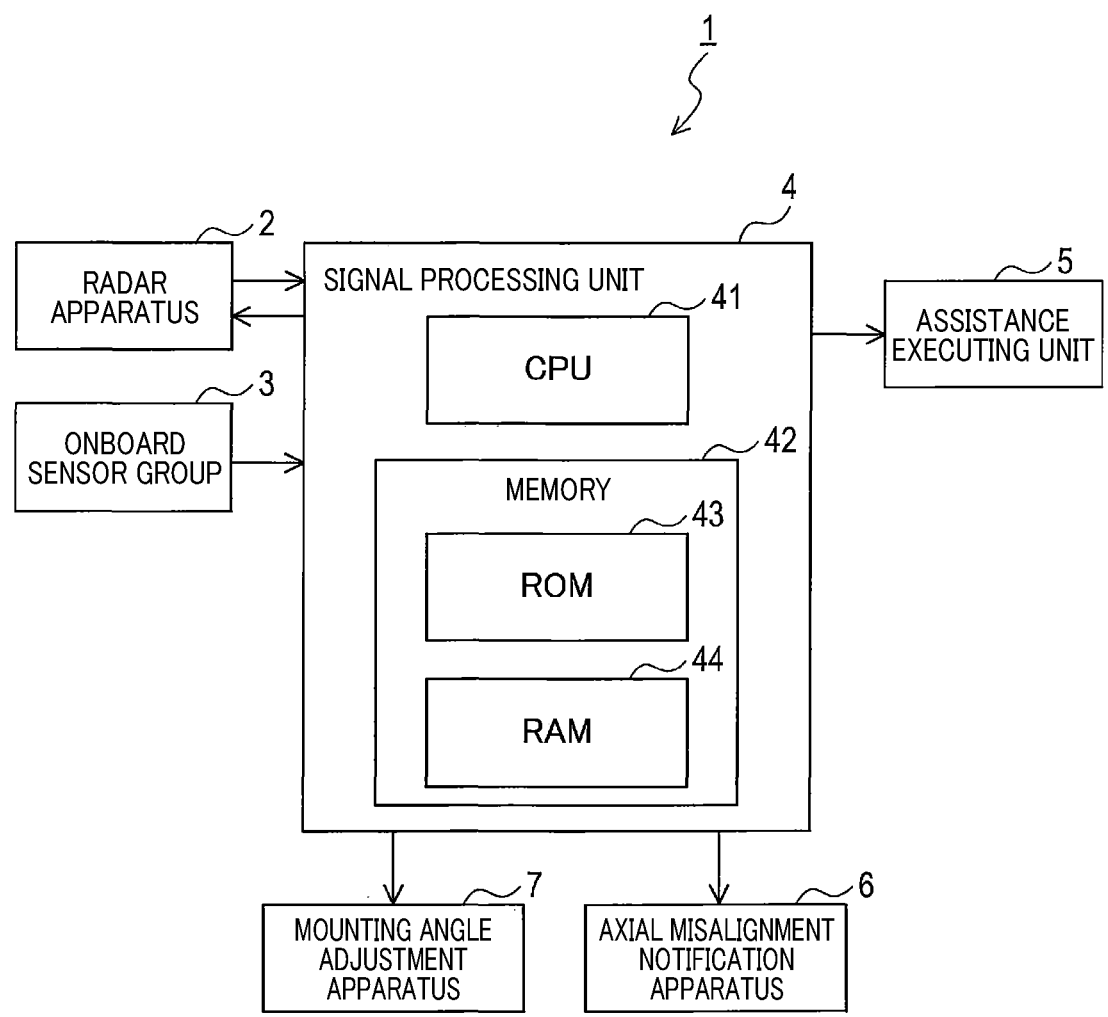
FIG. 1 is a block diagram illustrating a configuration of a vehicle control system.

As a technology for estimating an axial misalignment angle that is an angle of such axial misalignment, for example, JP-A-2018-054315 discloses a technology in which a reflection point that is assumed to be a point of reflection by a stationary object is extracted as a stationary reflection point, and the axial misalignment angle of the radar apparatus is estimated based on the extracted stationary reflection point. The stationary reflection point is extracted through use of a relative speed of the point of reflection by a stationary object being dependent on an orientation angle.

Here, a radar apparatus that includes a plurality of antennas that receive reflected waves from a target that reflects radar waves, and detects an orientation angle of a reflection point using a phase difference $\Delta\theta$ of the reflected waves that occurs between reception signals of each antenna cannot differentiate between $\Delta\theta=\theta_0$ and $\Delta\theta=\theta_0\pm2n\pi$ due to periodicity of the phase difference. Here, $|\theta_0|<\eta$ and $n=1, 2, \ldots$.

When the reflection point is present within a measurement angle range that is a range of the orientation angle corresponding to a range over which the phase difference $\Delta\theta$ is $-\pi<\theta\leq+\pi$ [rad], the radar apparatus can correctly detect the orientation angle of the reflection point. However, when the reflection point is present outside the measurement angle range, the radar apparatus erroneously detects the orientation angle of the reflection point by considering the reflection point to be present within the measurement angle range due to so-called aliasing (folding). That is, when aliasing is present at the orientation angle of the reflection point, an error is present between the detected orientation angle and an actual orientation angle.

However, in the axial misalignment estimation apparatus described in PTL 1, the axial misalignment angle is estimated without taking into consideration aliasing that is present at the orientation angle of the extracted stationary reflection point. As a result of keen examination by the inventors, an issue has been found in that, when aliasing is present at the orientation angle, an error occurs in a detection result of the orientation angle of the extracted stationary reflection point. Furthermore, estimation accuracy regarding the axial misalignment angle also decreases.

It is thus desired to provide a technology for improving estimation accuracy regarding an axial misalignment angle.

An exemplary embodiment of the present disclosure provides an axial misalignment estimation apparatus that estimates an axial misalignment angle of a radar apparatus that is mounted to a moving body, and includes a reflection point information acquiring unit, a moving body speed acquiring unit, an extracting unit, an aliasing processing unit, and an axial misalignment estimating unit.

The reflection point information acquiring unit is configured to acquire, for each reflection point detected by the radar apparatus, a relative speed of the reflection point relative to the radar apparatus and an orientation angle of the reflection point with reference to a direction that is prescribed based on design as a reference of the radar apparatus, at every measurement cycle set in advance.

The moving body speed acquiring unit is configured to acquire a moving body speed that is a speed of the moving body, at every measurement cycle.

The extracting unit is configured to extract, as a stationary reflection point, a reflection point that is assumed to be a point of reflection by a stationary object based on a predetermined extraction condition, among the reflection points detected by the radar apparatus.

The aliasing processing unit is configured to determine whether aliasing is present at the orientation angle of the stationary reflection point and correct the orientation angle of the stationary reflection point in which aliasing is determined to be present.

The axial misalignment estimating unit is configured to estimate the axial misalignment angle based on the orientation angle of the stationary reflection point.

The extraction condition is prescribed based on a relational expression that is established between an observed speed ratio that is a ratio of the relative speed of the reflection point and the moving body speed, and an estimated speed ratio that is the observed speed ratio estimated based on the orientation angle of the reflection point when the reflection point is a point of reflection by a stationary object.

The aliasing processing unit is configured to determine, for each stationary reflection point, whether aliasing is present at the orientation angle of the stationary reflection point based on a first estimated speed ratio that is the estimated speed ratio calculated using the orientation angle that is corrected based on the axial misalignment angle estimated at the measurement cycles up to a previous measurement cycle, and at least one second estimated speed ratio that is the first estimated speed ratio presuming that aliasing is present at the orientation angle.

The axial misalignment estimating unit is configured to estimate the axial misalignment angle based on the corrected orientation angle for the stationary reflection point of which the orientation angle is corrected by the aliasing processing unit.

As a result of a configuration such as this, estimation accuracy regarding an axial misalignment angle can be improved.

An exemplary embodiment of the present disclosure will hereinafter be described with reference to the drawings.

1. Configuration

A vehicle control system 1 shown in FIG. 1 is a system that is mounted to a vehicle. The vehicle control system 1 includes a radar apparatus 2, an onboard sensor group 3, a signal processing unit 4, an assistance executing unit 5, an axial misalignment notification apparatus 6, and a mounting angle adjustment apparatus 7. Hereafter, the vehicle in which the vehicle control system 1 is mounted is also referred to as an own vehicle. In addition, a vehicle width direction of the own vehicle is also referred to as a horizontal direction. A vehicle height direction of the own vehicle is also referred to as a vertical direction.

The radar apparatus 2 includes an antenna unit that transmits and receives radar waves. The antenna unit is configured to be capable of detecting an arrival direction of a reflected wave in both the vertical direction and the horizontal direction. According to the present embodiment, the antenna unit is an array antenna that includes a plurality of antennas that are arrayed in the vertical direction and the horizontal direction.

Figure 2:
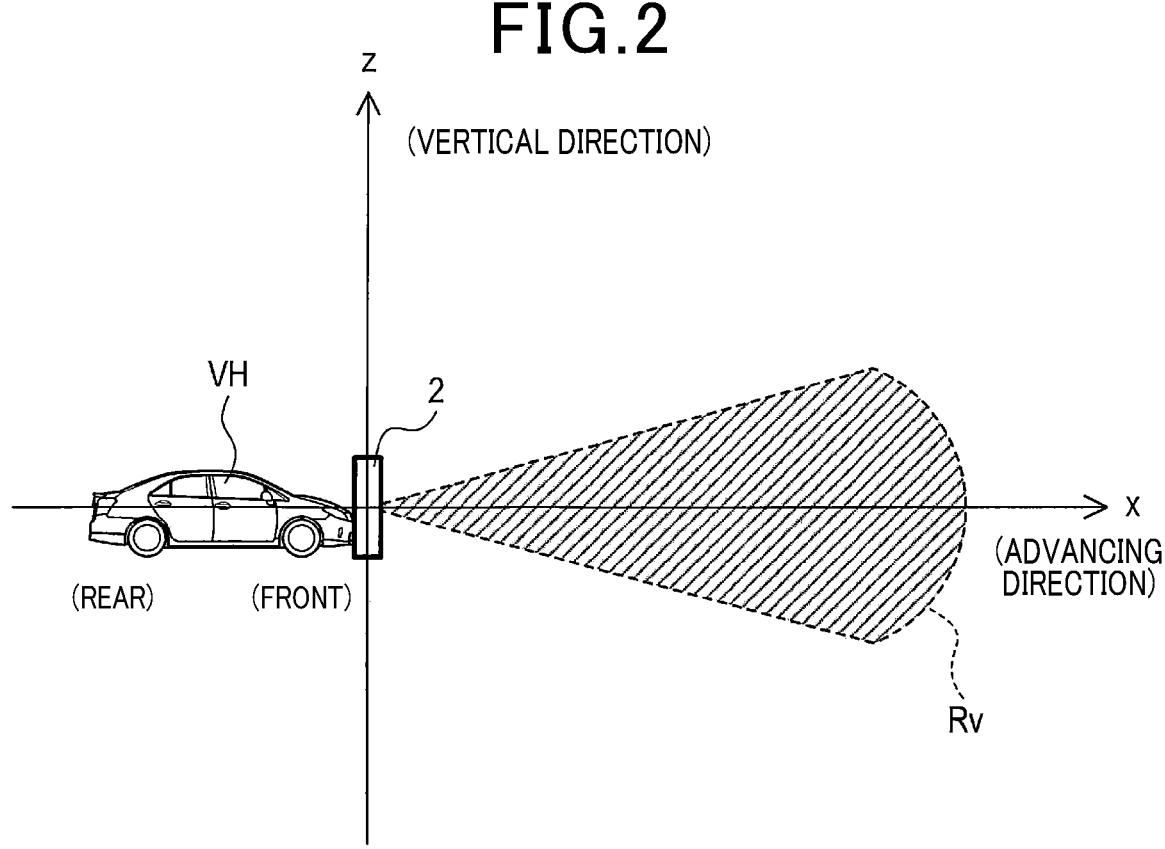
FIG. 2 is an explanatory diagram for explaining an irradiation range of a radar wave in a vertical direction.
Figure 3:
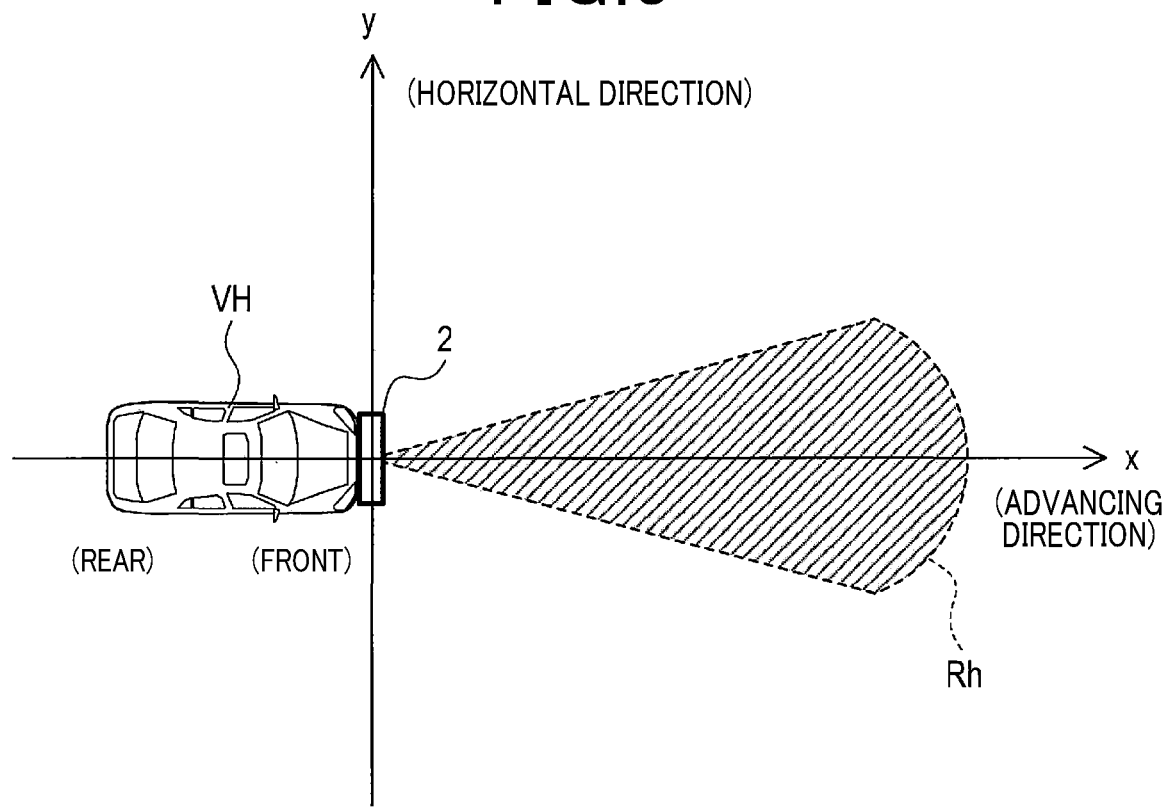
FIG. 3 is an explanatory diagram for explaining an irradiation range of the radar wave in a horizontal direction.

In addition, as shown in FIG. 2 and FIG. 3, the radar apparatus 2 is mounted on a front side of an own vehicle VH. The radar apparatus 2 irradiates radar waves over an irradiation range (irradiation region) that is a predetermined angular range ahead of the own vehicle VH. Specifically, the radar apparatus 2 irradiates the radar waves over an irradiation range Rv in the vertical direction and an irradiation range Rh in the horizontal direction. The radar apparatus 2 receives a reflected wave of the irradiated radar wave and thereby detects reflection point information that is related to a reflection point at which the radar wave is reflected. The reflection point information detected by the radar apparatus 2 includes at least a relative speed between the radar apparatus 2 and the reflection point, and an orientation angle of the reflection point.

Figure 4:
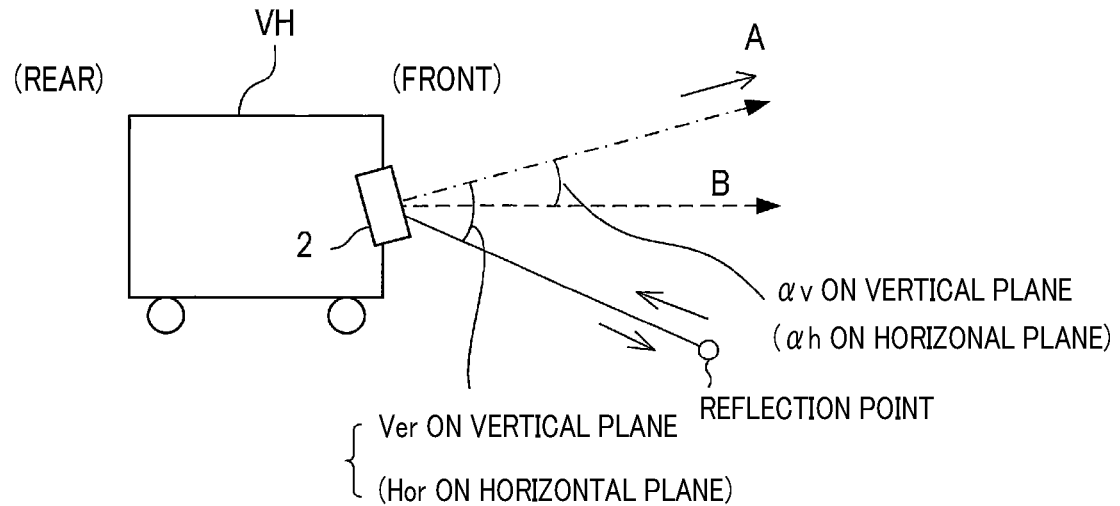
FIG. 4 is an explanatory diagram for explaining an orientation angle of a reflection point and axial misalignment.

As shown in FIG. 4, the orientation angle of the reflection point is at least either of a vertical angle Ver that is an angle in the vertical direction and a horizontal angle Hor that is an angle in the horizontal direction, among angles of the reflection point that are determined with reference to a reference direction A of the radar apparatus 2. According to the present embodiment, the vertical angle Ver and the horizontal angle Hor are both included in the reflection point information as information that indicates the orientation angle of the reflection point.

The vertical angle Ver is indicated by an angle in which, when the own vehicle VH is viewed from a right side surface, with the reference direction A of the radar apparatus 2 as reference, that is, 0°, a clockwise rotation from the reference direction A of the radar apparatus 2 is positive and a counter-clockwise rotation is negative. The horizontal angle Hor is indicated by an angle in which, when the own vehicle VH is viewed from above, with the reference direction A of the radar apparatus 2 as reference, a clockwise rotation from the reference direction A of the radar apparatus 2 is positive and a counter-clockwise rotation is negative. The reference direction A of the radar apparatus 2 is a direction of the radar apparatus 2 that is prescribed as reference based on design.

According to the present embodiment, a direction of a center axis of the irradiation range is set as the reference direction A of the radar apparatus 2. According to the present embodiment, the radar apparatus 2 is mounted to the own vehicle VH such that the reference direction A of the radar apparatus 2 coincides with the reference direction of the vehicle. The reference direction of the vehicle is a direction of the vehicle that is prescribed as reference based on design. According to the present embodiment, an advancing direction B of the own vehicle VH is set as the reference direction of the vehicle.

When the radar apparatus 2 is mounted to the own vehicle VH such that the reference direction A of the radar apparatus 2 and the advancing direction B of the own vehicle VH coincide, the detected orientation angle of the reflection point and an angle of the reflection point relative to the advancing direction B of the own vehicle VH coincide. In other words, when misalignment occurs between the reference direction A of the radar apparatus 2 and the advancing direction B of the own vehicle VH, information indicating the angle of the reflection point relative to the advancing direction B of the own vehicle VH cannot be correctly acquired.

FIG. 4 shows an aspect in which axial misalignment in the vertical direction, that is, axial misalignment on an x-z plane that is a vertical plane has occurred in the radar apparatus 2. Axial misalignment refers to a state in which the reference direction A of the radar apparatus 2 is shifted from the reference direction of the vehicle. In addition, an axial misalignment angle refers to an angle that indicates a magnitude of misalignment between the reference direction A of the radar apparatus 2 and the reference direction of the vehicle. According to the present embodiment, the reference direction of the vehicle is the advancing direction B of the own vehicle VH.

According to the present embodiment, the radar apparatus 2 uses an FMCW system. The radar apparatus 2 alternately transmits a radar wave of an upward modulation section and a radar wave of a downward modulation section at a modulation cycle that is set in advance, and receives the reflected radar waves. FMCW is an abbreviation of Frequency-Modulated Continuous Wave. As described above, at each modulation cycle, the radar apparatus 2 detects the relative speed to the reflection point, and the vertical angle Ver and the horizontal angle Hor that are the orientation angles of the reflection point as the reflection point information. Here, the radar apparatus 2 can further detect a distance to the reflection point and reception power of the received radar wave as the reflection point information.

Figure 5:
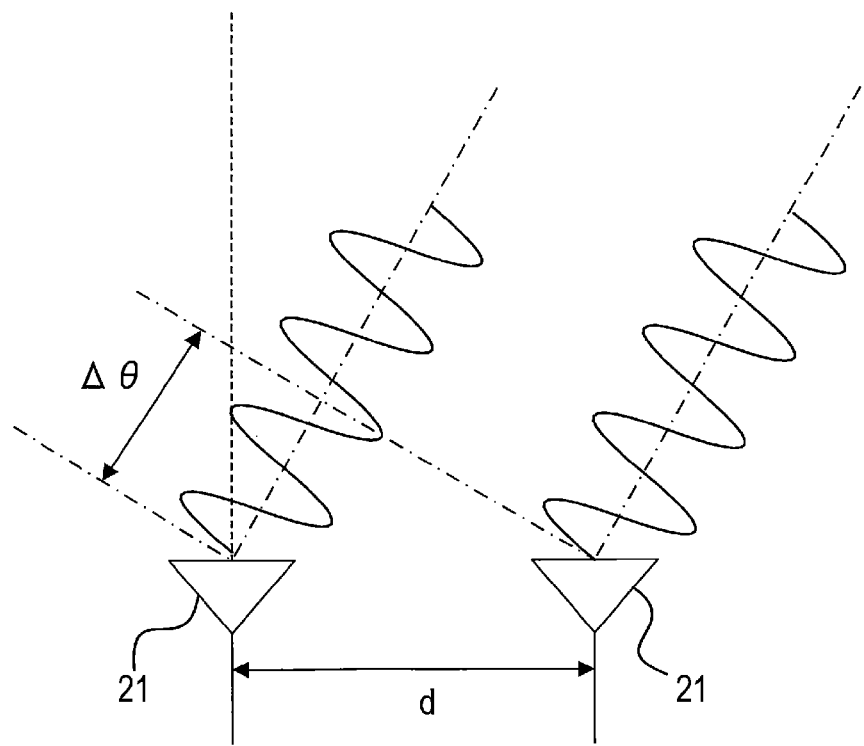
FIG. 5 is an explanatory diagram for explaining a principle of detecting the orientation angle of the reflection point.

As shown in FIG. 5, the orientation angle of the reflection point is detected using a phase difference $\Delta\theta$ of the reflected wave between reception signals received by the plurality of array antennas 21 provided in the radar apparatus 2.

Figure 6:
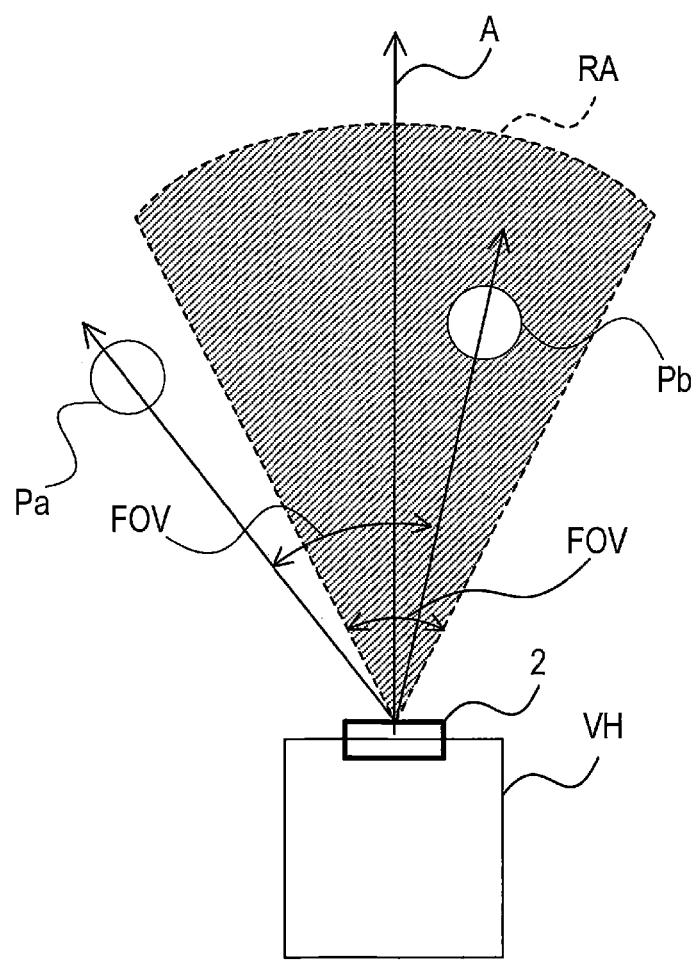
FIG. 6 is an explanatory diagram for explaining aliasing.

Here, aliasing that occurs at the orientation angle of the reflection point will be described with reference to FIG. 6. At this time, a range of the orientation angle that corresponds to a range over which the phase difference $\Delta\theta$ of the reflected waves that occurs between the reception signals of each antenna provided in the radar apparatus 2 is $-\pi<\theta\leq+\pi$[rad] is a measurement angle range RA. A reflection point that is present outside the measurement angle range RA is detected as a reflection point that is present within the measurement angle range RA due to aliasing.

Specifically, a reflection point Pa that is present outside the measurement angle range RA is detected as a reflection point that is present in a position Pb that is shifted by an amount amounting to an aliasing angle FOV that is a width of the orientation angle of the measurement angle range RA of the radar apparatus 2. In other words, the measurement angle range RA is a range of the orientation angle in which aliasing does not occur. Here, as shown in FIG. 5 and FIG. 6, the measurement angle range RA is determined by an element interval d of the plurality of antennas 21 provided in the radar apparatus 2 or the like.

Returning to FIG. 1, the onboard sensor group 3 is various types of sensors that are mounted to the own vehicle VH to detect a state of the own vehicle VH and the like. Here, as sensors that configure the onboard sensor group 3, at least a vehicle speed sensor that detects a vehicle speed based on rotation of a vehicle wheel is included.

The signal processing unit 4 is mainly configured by a microcomputer that includes a central processing unit (CPU) 41, a read-only memory (ROM) 43, a random access memory (RAM) 44, and a memory 42 that is a semiconductor memory such as a flash memory. Various functions of the signal processing unit 4 are actualized by the CPU 41 running a program that is stored in a non-transitory computer-readable (tangible) storage medium. In this example, the memory 42 is applicable as the non-transitory computer-readable (tangible) storage medium in which the program is stored. In addition, as a result of the program being run, a method corresponding to the program is implemented.

Here, the signal processing unit 4 may be configured by one or a plurality of microcomputers. In addition, a means for actualizing the various functions of the signal processing unit 4 is not limited to software. Some or all of the elements may be actualized by one or a plurality of pieces of hardware. For example, when the above-described functions are implemented by an electronic circuit that is hardware, the electronic circuit may be implemented by a digital circuit that includes numerous logic circuits, an analog circuit, or a combination thereof.

Processes performed by the signal processing unit 4 include at least a target recognition process and an axial misalignment estimation process.

Of the processes, the target recognition process is a process in which a traffic lane in which the own vehicle VH is traveling, a leading vehicle that is traveling in a same traffic lane as the own vehicle VH, other vehicles, obstacles, and the like are detected based on the reflection point information acquired from the radar apparatus 2 and various types of information acquired from the onboard sensor group 3. A processing result of the target recognition process is provided to the assistance executing unit 5 and the like.

Meanwhile, the axial misalignment estimation process is a process in which the axial misalignment angle of the radar apparatus 2 relative to the advancing direction of the own vehicle VH is detected. Details thereof will be described hereafter.

The assistance executing unit 5 controls various onboard apparatuses and performs predetermined driving assistance based on the processing result of the target recognition process performed by the signal processing unit 4. The onboard apparatuses to be controlled include a monitor that displays various types of images, and audio equipment that outputs warning sounds and voice guidance. In addition, the onboard apparatuses may include control apparatuses that control an internal combustion engine, a power train mechanism, a brake mechanism, and the like of the own vehicle VH.

The axial misalignment notification apparatus 6 is an audio output apparatus that is set inside a vehicle cabin. The axial misalignment notification apparatus 6 outputs a warning sound to a passenger of the own vehicle VH based on information outputted from the signal processing unit 4.

The mounting angle adjustment apparatus 7 includes a motor and a gear that is attached to the radar apparatus 2. The mounting angle adjustment apparatus 7 rotates the motor based on a drive signal that is outputted from the signal processing unit 4. As a result, rotational force from the motor is transmitted to the gear, and the mounting angle adjustment apparatus 7 is able to rotate the radar apparatus 2 around an axis along the horizontal direction and an axis along the vertical direction.

2. Processes

Figure 7:
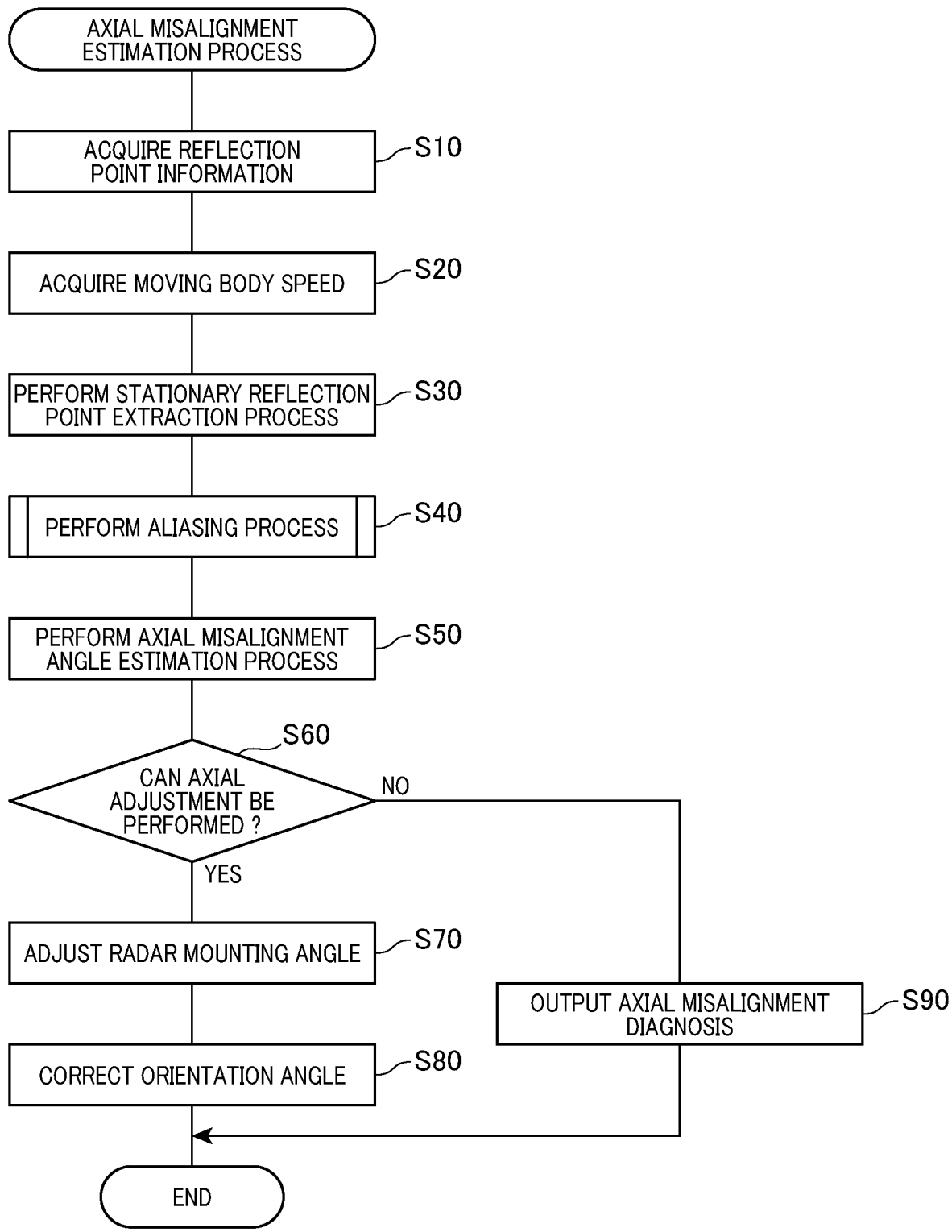
FIG. 7 is a flowchart illustrating an axial misalignment estimation process.

Next, the axial misalignment estimation process performed by the signal processing unit 4 will be described with reference to FIG. 7. The axial misalignment estimation process is started at every measurement cycle in which the radar waves are transmitted and received, while an ignition switch is turned on.

When the axial misalignment estimation process is started, at S10, the signal processing unit 4 acquires the reflection point information from the radar apparatus 2. Hereafter, the reflection point that is identified from the reflection point information is referred to as an acquired reflection point.

Next, at S20, the signal processing unit 4 acquires a moving body speed Cm that is a speed of the own vehicle VH from the onboard sensor group 3.

Next, at S30, the signal processing unit 4 performs a stationary reflection point extraction process on all acquired reflection points. The stationary reflection point extraction process is a process in which an acquired reflection point that is assumed to be a point at which the radar wave is reflected by a stationary object is extracted as the stationary reflection point from the acquired reflection points.

Here, a principle of extracting the stationary reflection point in the stationary reflection point extraction process will be described. On a coordinate system in which a horizontal axis is the orientation angle and a vertical axis is a speed ratio −q/Cm that is a ratio of a relative speed q and the moving body speed Cm, the signal processing unit 4 plots the orientation angle and the speed ratio −q/Cm, and thereby extracts the stationary reflection point. Here, because an orientation of the relative speed q is opposite an orientation of the moving body speed Cm, q/Cm is negative at all times. To make the sign positive, the speed ratio −q/Cm is a value in which a value of q/Cm is multiplied by −1. Here, an example in which the stationary reflection point is extracted when axial misalignment in the vertical direction is assumed will be described.

Figure 8:
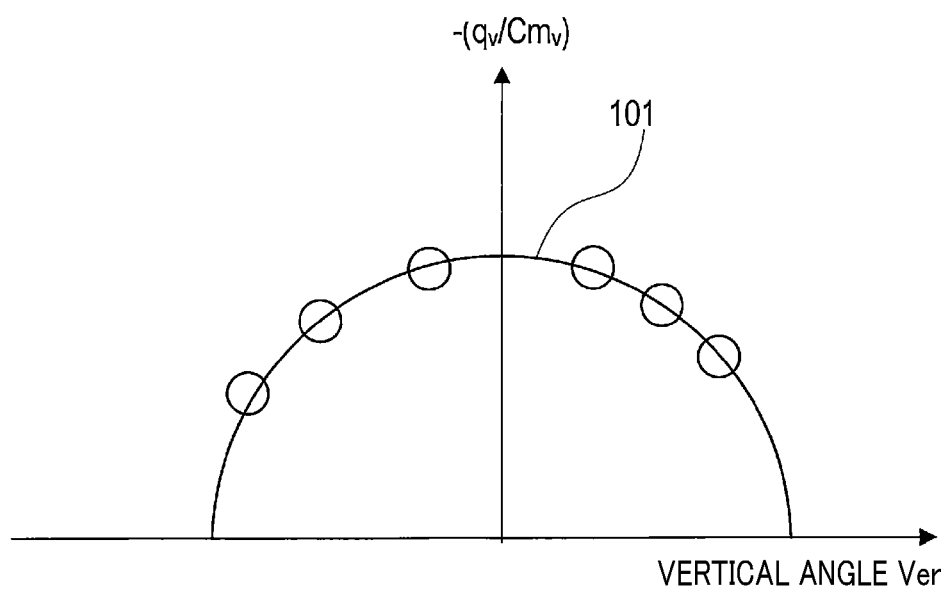
FIG. 8 is an explanatory diagram for explaining a principle of extracting a stationary reflection point.

Axial misalignment in the vertical direction refers to axial misalignment on the x-z plane that is the vertical plane. A coordinate system shown in FIG. 8 is a coordinate system in which a horizontal axis is the vertical angle Ver, and a vertical axis is a vertical speed ratio $-q_v/Cm_v$ that is a ratio of a magnitude $q_v$ of the relative speed q on the x-z plane and a magnitude $Cm_v$ of the moving body speed Cm on the x-z plane.

When the vertical angle Ver and the vertical speed ratio $-q_v/Cm_v$ of a reflection point are projected and plotted on the coordinate system, when axial misalignment has not occurred in the radar apparatus 2, a point of reflection by a stationary object is plotted on a specific curved line 101. Therefore, when the vertical angle and the vertical speed ratio of a reflection point are projected and plotted on the coordinate system shown in FIG. 8, a reflection point that is plotted on the curved line 101 is assumed to be a point of reflection by a stationary object.

That is, the speed ratio −q/Cm of a point of reflection by a stationary object can be said to be dependent on the orientation angle of the point of reflection by a stationary object. Here, in the coordinate system shown in FIG. 8, the curved line on which the point of reflection by a stationary object is plotted is also hereafter referred to as an ideal curved line. In the example described above, the curved line 101 is the ideal curved line.

The estimation method described above is merely an estimation method in an ideal state. In actuality, errors such as a detection error of the reflection point by the radar apparatus 2 occur. Therefore, taking into consideration such errors, a reflection point that is plotted within a fixed range in which the detection error and the like are added to the ideal curved line, such as the curved line 101, is assumed to be a point of reflection by a stationary object and extracted as the stationary reflection point.

Hereafter, the stationary reflection point extraction process performed at S30 will be described.

First, the signal processing unit 4 calculates an observed speed ratio $V_{obs}$ based on the relative speed q that is included in the reflection point information acquired from the radar apparatus 2 at S10 and the moving body speed Cm acquired at S20. The observed speed ratio $V_{obs}$ is a speed ratio that is calculated from the relative speed q that is included in the reflection point information actually generated by the radar apparatus 2 and the moving body speed Cm. According to the present embodiment, the signal processing unit 4 calculates the observed speed ratio $V_{obs}$ by expression (1), based on the relative speed q and the moving body speed Cm.

$$V_{obs} = -\frac{q}{Cm} \tag{1}$$

Next, the signal processing unit 4 calculates an estimated speed ratio $V_{est}$ based on the orientation angle that is included in the reflection point information acquired from the radar apparatus 2 at S10. The estimated speed ratio $V_{est}$ is the observed speed ratio $V_{obs}$ that is estimated when the acquired reflection point is a point of reflection by a stationary object. According to the present embodiment, the signal processing unit 4 calculates the estimated speed ratio $V_{est}$ by expression (2), based on the vertical angle Ver and the horizontal angle Hor included in the reflection point information generated by the radar apparatus 2.

$$V_{est} = \sqrt{1 - (\sin(Ver))^2 - (\sin(Hor))^2} \tag{2}$$

Next, the signal processing unit 4 extracts the stationary reflection point from the acquired reflection points. Specifically, the signal processing unit 4 determines whether the observed speed ratio $V_{obs}$, the estimated speed ratio $V_{est}$, and a threshold ε that is set in advance satisfy expression (3). The signal processing unit 4 extracts the acquired reflection point that is determined to satisfy expression (3) as the stationary reflection point.

When the acquired reflection point is the point of reflection by a stationary object, the observed speed ratio $V_{obs}$ of the acquired reflection point coincides with the estimated speed ratio $V_{est}$. Therefore, the acquired reflection point of which a left side of expression (3) is 0 is assumed to be a point of reflection by a stationary object. However, due to effects of error, even when the acquired reflection point is a point of reflection by a stationary object, the left side of expression (3) may not necessarily be 0. Therefore, a threshold ε that is set as appropriate taking into consideration effects of error is used.

$$|V_{obs} - V_{est}| < \varepsilon \tag{3}$$

Returning to FIG. 7, at S40, the signal processing unit 4 performs an aliasing process.

The aliasing process is a process in which whether aliasing is present at the orientation angle of the stationary reflection point is determined for the stationary reflection point extracted at S30, and the orientation angle of the stationary reflection point in which aliasing is determined to be present is corrected.

Figure 9:
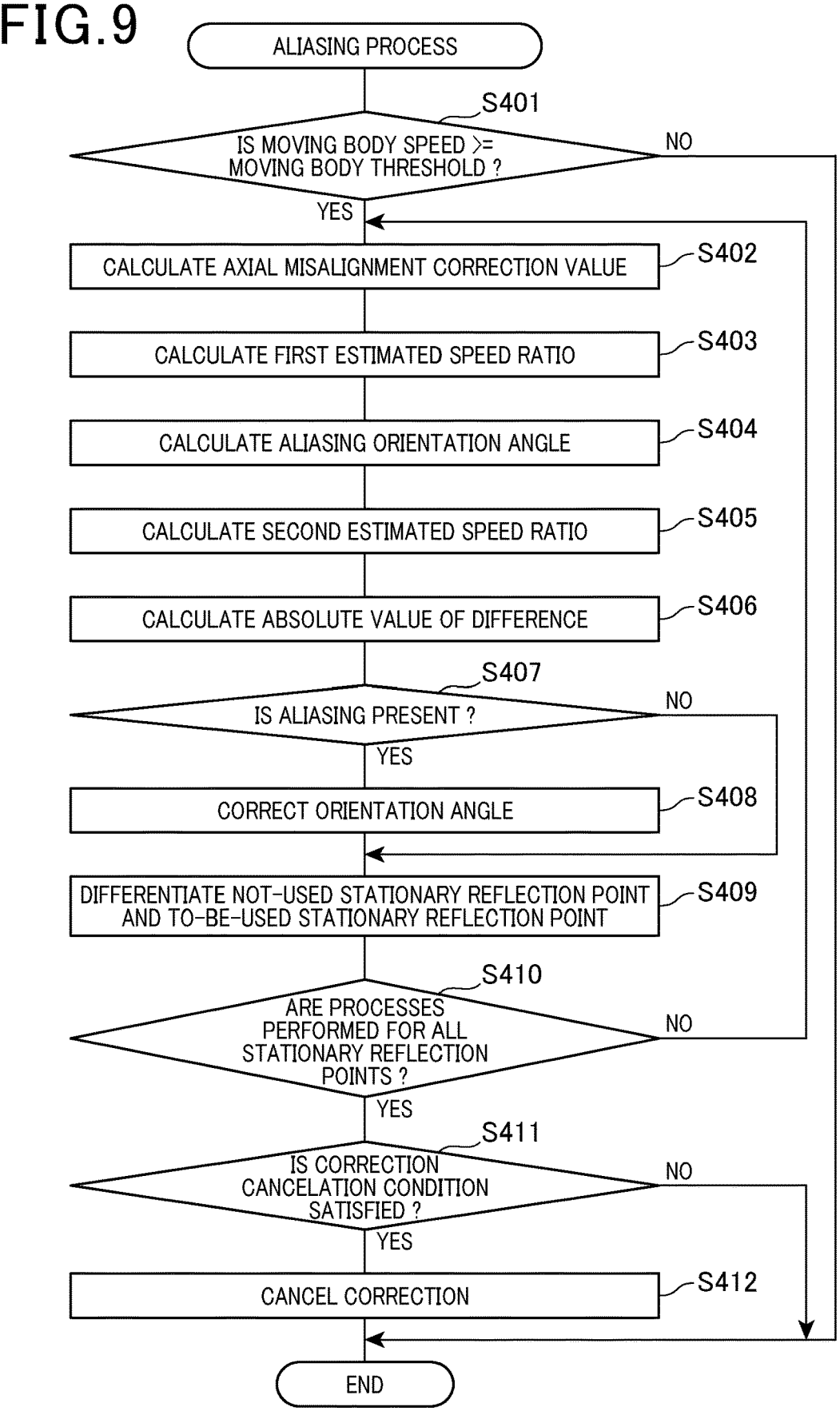
FIG. 9 is a flowchart illustrating an aliasing process.

Here, the aliasing process performed at S40 will be described with reference to a flowchart in FIG. 9. Here, processes at S401 to S409 are performed for each stationary reflection point for all stationary reflection points.

First, at S401, the signal processing unit 4 determines whether the moving body speed Cm acquired at S20 is equal to or greater than a predetermined moving body threshold. When determined that the moving body speed Cm is equal to or greater than the moving body threshold, the signal processing unit 4 proceeds to S402. When determined that the moving body speed Cm is not equal to or greater than the moving body threshold, the signal processing unit 4 ends the aliasing process.

At S402, the signal processing unit 4 calculates an axial misalignment correction value based on a previous axial misalignment angle that is an axial misalignment angle estimated in a previous measurement cycle. The axial misalignment angle is estimated by an axial misalignment angle estimation process performed at S50, described hereafter. The axial misalignment correction value is a value that is used to correct the orientation angle of the stationary reflection point when a first estimated speed ratio $V_{obs\_est}$ and a second estimated speed ratio $V_{fold}$, described hereafter, are calculated.

The signal processing unit 4 multiplies a previous vertical axial misalignment angle $\alpha_{v\_pre}$ that is an axial misalignment angle in the vertical direction that is calculated in the previous measurement cycle by a forgetting factor k, and calculates a vertical axial misalignment correction value $\beta_v$ by expression (4). The vertical axial misalignment correction value $\beta_v$ is a value that is used to correct the vertical angle Ver of the stationary reflection point.

$$\beta_v = \alpha_{v\_pre} \times k \tag{4}$$

Here, the forgetting factor k is expressed by expression (5). In expression (5), $num_{est}$ is a number of times the axial misalignment estimation process is performed by the signal processing unit 4. $Const_{num}$ is a constant that is set in advance. That is, a value of the forgetting factor k approaches 1 as the number of times the axial misalignment estimation process is performed by the signal processing unit 4 increases.

$$k = \frac{\min(num_{est}, Const_{num})}{Const_{num}} \tag{5}$$

In a similar manner, the signal processing unit 4 multiplies a previous horizontal axial misalignment angle dh pre that is an axial misalignment angle in the horizontal direction that is calculated in the previous measurement cycle by the forgetting factor k, and calculates a horizontal axial misalignment correction value $\beta_h$ by expression (4). The horizontal axial misalignment correction value $\beta_h$ is a value that is used to correct the horizontal angle Hor of the stationary reflection point.

$$\beta_h = \alpha_{h\_pre} \times k \tag{6}$$

Next, at S403, the signal processing unit 4 calculates the first estimated speed ratio $V_{obs\_est}$ based on the orientation angle of the stationary reflection point. The first estimated speed ratio $V_{obs\_est}$ is the estimated speed ratio $V_{est}$ that is calculated using the orientation angle that is corrected based on the axial misalignment angles estimated in measurement cycles up to the previous measurement cycle.

According to the present embodiment, the signal processing unit 4 calculates the first estimated speed ratio $V_{obs\_est}$ by expression (7), based on respective values obtained by the vertical angle Ver being corrected by the vertical axial misalignment correction value $\beta_v$ and the horizontal angle Hor being corrected by the horizontal axial misalignment correction value $\beta_h$.

$$V_{obs\_est} = 1 - \overline{(\sin(Ver+\beta_v))^2 - (\sin(\overline{Hor+\beta_h}))^2} \tag{7}$$

Next, at step S404, the signal processing unit 4 calculates an aliasing orientation angle based on the orientation angle of the stationary reflection point and the aliasing angle FOV. The aliasing orientation angle is the orientation angle at which the stationary reflection point is assumed to be present when aliasing is presumed to be present at the orientation angle of the stationary reflection point.

First, an example in which a vertical aliasing orientation angle $Ver_{fold}$ that is the aliasing orientation angle when aliasing is present at the vertical angle is calculated will be described. According to the present embodiment, the signal processing unit 4 determines whether the vertical angle Ver is greater than 0°. When determined that the vertical angle Ver is greater than 0°, the signal processing unit 4 calculates the vertical aliasing orientation angle $Ver_{fold}$ by expression (8). Here, the aliasing angle in the vertical direction is a vertical aliasing angle vFOV.

$$Ver_{fold} = Ver - vFOV \tag{8}$$

Meanwhile, when determined that the vertical angle Ver is equal to or less than 0°, the signal processing unit 4 calculates the vertical aliasing orientation angle $Ver_{fold}$ by expression (9).

$$Ver_{fold} = Ver + vFOV \tag{9}$$

In a similar manner, an example in which a horizontal aliasing orientation angle $Hor_{fold}$ that is the aliasing orientation angle when aliasing is present at the horizontal angle Hor is calculated will be described. According to the present embodiment, the signal processing unit 4 determines whether the horizontal angle Hor is greater than 0°. When determined that the horizontal angle Hor is greater than 0°, the signal processing unit 4 calculates the horizontal aliasing orientation angle $Hor_{fold}$ by expression (10). Here, the aliasing angle in the horizontal direction is a horizontal aliasing angle hFOV.

$$Hor_{fold} = Hor - hFOV \tag{10}$$

Meanwhile, when determined that the horizontal angle Hor is equal to or less than 0°, the signal processing unit 4 calculates the horizontal aliasing orientation angle $Hor_{fold}$ by expression (11).

$$Hor_{fold} = Hor + hFOV \tag{11}$$

Next, at step S405, the signal processing unit 4 calculates the second estimated speed ratio $V_{fold}$ based on the orientation angle of the stationary reflection point and the aliasing orientation angle calculated at S404. The second estimated speed ratio $V_{fold}$ is the first estimated speed ratio $V_{obs\_est}$ when aliasing is assumed to be present at the orientation angle of the stationary reflection point.

According to the present embodiment, the signal processing unit 4 respectively calculates a vertical second estimated speed ratio $V_{v\_fold}$, a horizontal second estimated speed ratio $V_{h\_fold}$, and a vertical-horizontal second estimated speed ratio $V_{vh\_fold}$ by expression (12), expression (13), and expression (14).

The vertical second estimated speed ratio $V_{v\_fold}$ is the second estimated speed ratio $V_{fold}$ when aliasing is assumed to be present at the vertical angle. The horizontal second estimated speed ratio $V_{h\_fold}$ is the second estimated speed ratio $V_{fold}$ when aliasing is assumed to be present at the horizontal angle. The vertical-horizontal second estimated speed ratio $V_{vh\_fold}$ is the second estimated speed ratio $V_{fold}$ when aliasing is assumed to be present at both the vertical angle Ver and the horizontal angle Hor.

$$V_{v\_fold} = \sqrt{1-(\sin(Ver_{fold}+\beta_v))^2-(\sin(Hor+\beta_h))^2} \qquad (12)$$

$$V_{h\_fold} = \sqrt{1-(\sin(Ver+\beta_v))^2-(\sin(Hor_{fold}+\beta_h))^2} \qquad (13)$$

$$V_{vh\_fold} = \sqrt{1-(\sin(Ver_{fold}+\beta_v))^2-(\sin(Hor_{fold}+\beta_h))^2} \qquad (14)$$

Next, at step S406, the signal processing unit 4 calculates a first difference $d_1$ that is an absolute value of a difference between the observed speed ratio $V_{obs}$ calculated at S30 and the first estimated speed ratio $V_{obs\_est}$ by expression (15).

$$d_1 = |V_{obs\_est} - V_{obs}| \qquad (15)$$

In a similar manner, the signal processing unit 4 calculates a second difference $d_2$ that is an absolute value of a difference between the observed speed ratio $V_{obs}$ and the second estimated speed ratio $V_{fold}$. Specifically, the signal processing unit 4 respectively calculates a vertical second difference $d_{v\_2}$, a horizontal second difference $d_{h\_2}$, and a vertical-horizontal second difference $d_{vh\_2}$ by expression (16), expression (17), and expression (18).

The vertical second difference $d_{v\_2}$ is an absolute value of a difference between the observed speed ratio $V_{obs}$ and the vertical second estimated speed ratio $V_{v\_fold}$. The horizontal second difference $d_{h\_2}$ is an absolute value of a difference between the observed speed ratio $V_{obs}$ and the horizontal second estimated speed ratio $V_{h\_fold}$. The vertical-horizontal second difference $d_{vh\_2}$ is an absolute value of a difference between the observed speed ratio $V_{obs}$ and the vertical-horizontal second estimated speed ratio $V_{vh\_fold}$.

$$d_{v\_2} = |V_{v\_fold} - V_{obs}| \qquad (16)$$

$$d_{h\_2} = |V_{h\_fold} - V_{obs}| \qquad (17)$$

$$d_{vh\_2} = |V_{vh\_fold} - V_{obs}| \qquad (18)$$

Subsequently, the signal processing unit 4 selects a smallest value among the first difference d1, the vertical second difference $d_{v\_2}$, the horizontal second difference $d_{h\_2}$, and the vertical-horizontal second difference $d_{vh\_2}$ as a minimum difference.

Next, at step S407, the signal processing unit 4 determines whether aliasing is present at the orientation angle of the stationary reflection point based on the minimum difference selected at S406.

Specifically, when the vertical second difference $d_{v\_2}$ is selected as the minimum difference, the signal processing unit 4 determines that aliasing is present at the vertical angle Ver and aliasing is not present at the horizontal angle Hor of the stationary reflection point.

When the horizontal second difference $d_{h\_2}$ is selected as the minimum difference, the signal processing unit 4 determines that aliasing is not present at the vertical angle Ver and aliasing is present at the horizontal angle Hor of the stationary reflection point.

When the vertical-horizontal second difference $d_{vh\_2}$ is selected as the minimum difference, the signal processing unit 4 determines that aliasing is present at both the vertical angle Ver and the horizontal angle Hor of the stationary reflection point. When the first difference $d_1$ is selected as the minimum difference, the signal processing unit 4 determines that aliasing is not present at either of the vertical angle Ver and the horizontal angle Hor of the stationary reflection point.

When determined that aliasing is present at at least either of the vertical angle Ver and the horizontal angle Hor of the stationary reflection point, the signal processing unit 4 proceeds to S408. When determined that aliasing is not present at both of the vertical angle Ver and the horizontal angle Hor of the stationary reflection point, the signal processing unit proceeds to S409.

At S408, the signal processing unit 4 corrects the orientation angle of the stationary reflection point in which aliasing is determined to be present at the orientation angle at S407. Specifically, when determined that aliasing is present at the vertical angle Ver, the signal processing unit 4 corrects the vertical angle Ver of the stationary reflection point to the vertical aliasing orientation angle $Ver_{fold}$. Meanwhile, when determined that aliasing is present at the horizontal angle Hor, the signal processing unit 4 corrects the horizontal angle Hor of the stationary reflection point to the horizontal aliasing orientation angle $Hor_{fold}$.

In addition, when determined that aliasing is present at both of the vertical angle Ver and the horizontal angle Hor, the signal processing unit 4 respectively corrects the vertical angle Ver and the horizontal angle Hor in the manner described above. That is, only the orientation angle of the stationary reflection point in which aliasing is determined to be present at the orientation angle is corrected. The orientation angle of the stationary reflection point in which aliasing is determined not to be present at the orientation angle is not corrected. Subsequently, the signal processing unit 4 proceeds to S409.

At S409, the signal processing unit 4 performs a process to differentiate a not-used stationary reflection point and a to-be-used stationary reflection point. Specifically, first, the signal processing unit 4 determines whether the minimum difference selected at S406 is equal to or greater than a predetermined not-used stationary reflection point threshold. Then, the signal processing unit 4 performs a process to differentiate between the not-used stationary reflection point that is a stationary reflection point of which the minimum difference is determined to be equal to or greater than the not-used stationary reflection point threshold and the to-be-used stationary reflection point that is a stationary reflection point of which the minimum difference is determined not to be equal to or greater than the not-used stationary reflection point threshold.

The not-used stationary reflection point is not used in the axial misalignment angle estimation process performed at S50, described hereafter. For example, as the process for differentiating the not-used stationary reflection point and the to-be-used stationary reflection point, a process in which, after whether the minimum difference is equal to or greater than the not-used stationary reflection point threshold is determined, a flag for the not-used stationary reflection point or the to-be-used stationary reflection point is added to the stationary reflection point can be given.

In other words, the process at step S409 is a process that is performed to prevent use of a stationary reflection point of which the absolute values of all of the differences are equal to or greater than the not-used stationary reflection point threshold in the axial misalignment angle estimation process. The process at S409 is a process in which a flag is added to all of the stationary reflection points, and the stationary reflection points of which the absolute values of all of the differences are equal to or greater than the not-used stationary reflection point threshold and other stationary reflection points are differentiated.

Figure 10:
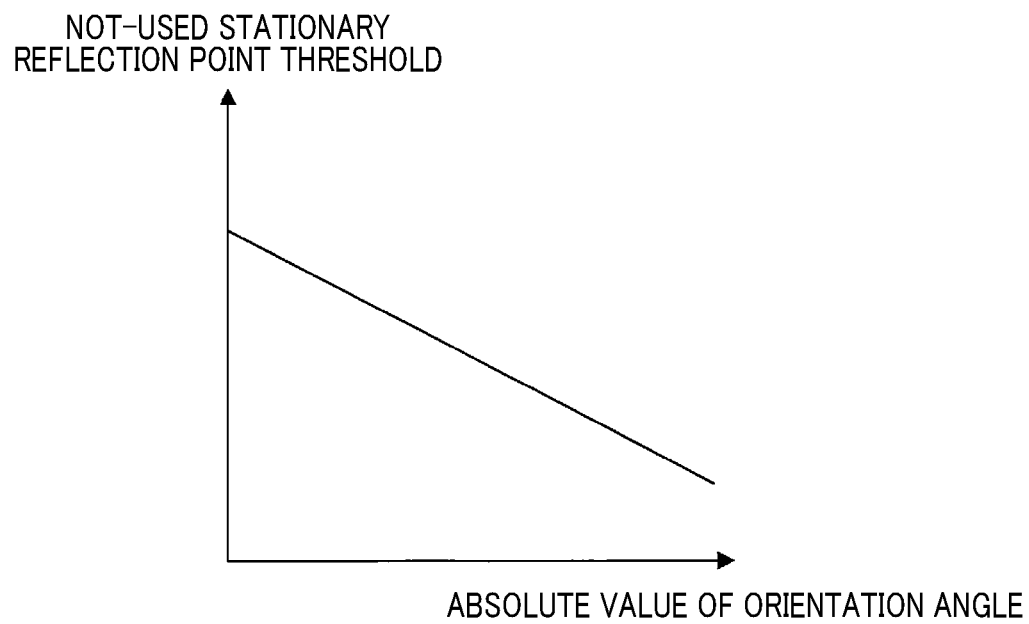
FIG. 10 is an explanatory diagram for explaining a principle of setting a not-used stationary reflection point threshold.

For example, as shown in FIG. 10, the not-used stationary reflection point threshold may be set for each stationary reflection point so as to decrease as the absolute value of the orientation angle of the stationary reflection point increases. For example, as the absolute value of the orientation angle of the stationary reflection point, an average value of an absolute value of the vertical angle Ver and an absolute value of the horizontal angle Hor of the stationary reflection point may be used.

At S410, the signal processing unit 4 determines whether the processes at S402 to S409 are performed for all stationary reflection points. When determined that a stationary reflection point for which the processes at S402 to S409 have not been performed is present, the signal processing unit 4 returns to S402. When determined that the processes at S402 to S409 are performed for all stationary reflection points, the signal processing unit 4 proceeds to S411.

At S411, the signal processing unit 4 determines whether, with all stationary reflection points as a population, the population satisfies a predetermined correction cancelation condition. When determined that the population satisfies the predetermined correction cancelation condition, the signal processing unit 4 uses the orientation angle rather than the orientation angle corrected at S408 in the axial misalignment angle estimation process performed at S50, described hereafter. When determined that the population satisfies the predetermined correction cancelation condition, the signal processing unit 4 proceeds to S412. When determined that the population does not satisfy the predetermined correction cancelation condition, the signal processing unit 4 ends the aliasing process.

The correction cancelation condition is a condition that the minimum differences of all stationary reflection points within the population are equal to or greater than a predetermined difference threshold. However, the correction cancelation condition is not limited thereto. The condition is merely required to be that which enables determination that the minimum differences as a whole are trending towards increase. For example, the condition may be that, within the population, the minimum differences of most stationary reflection points are equal to or greater than the predetermined difference threshold. In addition, the condition may be that an average of the minimum differences of all stationary reflection points within the population is equal to or greater than the predetermined difference threshold. Here, according to the present embodiment, the difference threshold is less than the not-used stationary reflection point threshold.

At S412, the signal processing unit 4 cancels the correction performed at S408 for the orientation angles of all stationary reflection points of which the orientation angles are corrected at S408. That is, even regarding the stationary reflection point in which aliasing is determined to be present at the orientation angle, the signal processing unit 4 does not set the orientation angle corrected at S408 as the orientation angle of the stationary reflection point. In other words, when the minimum differences as a whole are determined to be trending towards increase at S411, regarding all stationary reflection points, the orientation angle included in the reflection point information acquired from the radar apparatus 2 at S10 is used rather than the orientation angle corrected at S408.

Meanwhile, when the population is determined not to satisfy the predetermined correction cancelation condition at S411, the process at S412 is not performed. In other words, when the minimum differences as a whole are determined not to be trending towards increase at S411, the orientation angle corrected at S408 is used for the stationary reflection point in which aliasing is determined to be present at the orientation angle. Meanwhile, the orientation angle included in the reflection point information acquired from the radar apparatus 2 at S10 is used for the stationary reflection point in which aliasing is determined not to be present at the orientation angle.

Subsequently, the signal processing unit 4 ends the aliasing process.

Returning to FIG. 7, at S50, the signal processing unit 4 performs the axial misalignment angle estimation process in which the axial misalignment angle is estimated using the orientation angle of the to-be-used stationary reflection point. Here, the not-used stationary reflection point is not used in the axial misalignment angle estimation process. Hereafter, an example in which a vertical axial misalignment angle $\alpha_v$ that is the axial misalignment angle in the vertical direction is estimated will be described. For example, the signal processing unit 4 may estimate the vertical axial misalignment angle $\alpha_v$ using expression (19).

$$\frac{q_v}{Cm_v} = \gamma_v \cos(Ver') = \gamma_v \cos(Ver + \alpha_v) \tag{19}$$

Here, Ver' is the vertical angle Ver when axial misalignment has not occurred in the radar apparatus 2. $q_v$ is the magnitude of the relative speed q of the to-be-used stationary reflection point on the x-z plane. $Cm_v$ is the magnitude of the moving body speed Cm on the x-z plane. $\gamma_v$ is a vertical moving body speed error that is a magnitude of a moving body speed error $\gamma$ that is an error included in the moving body speed Cm, on the x-z plane.

Based on expression (19), for each to-be-used stationary reflection point, an equation in which the vertical axial misalignment angle $\alpha_v$ and the vertical moving body speed error $\gamma_v$ are unknown parameters is obtained. That is, the same number of simultaneous equations as the number of to-be-used stationary reflection points is obtained. As a result of these simultaneous equations being solved, the vertical axial misalignment angle $\alpha_v$ and the vertical moving body speed error $\gamma_v$ are determined. As a specific method of solving the simultaneous equations, for example, a least squares method may be used. However, the method of solving the simultaneous equations is not limited to the least squares method.

Figure 11:
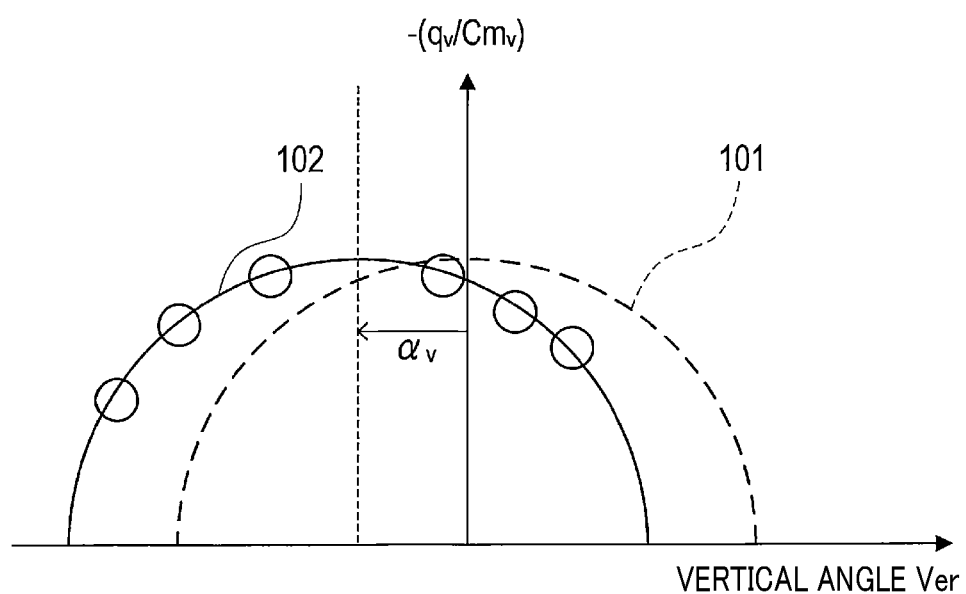
FIG. 11 is an explanatory diagram for explaining a principle of estimating an axial misalignment angle.

Here, a principle of estimating the axial misalignment angle will be described. As described above, when axial misalignment has not occurred in the radar apparatus 2, as shown in FIG. 6, a point of reflection by a stationary object is plotted on the curved line 101. However, when axial misalignment has occurred in the radar apparatus 2, as shown in FIG. 11, the point of reflection by a stationary object is plotted on a curved line 102 that is a curved line in which the curved line 101 is moved in parallel in a horizontal axis direction by an amount amounting to the vertical axial misalignment angle $\alpha_v$. That is, when axial misalignment occurs in the radar apparatus 2, it can be said that the ideal curved line moves in the horizontal axis direction from the curved line 101 by an amount amounting to the vertical axial misalignment angle $\alpha_v$.

Therefore, solving the simultaneous equations in expression (19) corresponds to determining optimal vertical axial misalignment angle $\alpha_v$ and vertical moving body speed error $\gamma_v$ such that the extracted stationary reflection point is plotted on the curved line 102.

Here, the signal processing unit 4 similarly estimates a horizontal axial misalignment angle $\alpha_h$ using expression (20). Axial misalignment in the horizontal direction refers to axial misalignment on an x-y plane that is a horizontal plane.

$$\frac{q_h}{Cm_h} = \gamma_h \cos(Hor') = \gamma_h \cos(Hor + \alpha_h) \qquad (20)$$

Here, Hor' is the horizontal angle Hor when axial misalignment has not occurred in the radar apparatus 2. $q_h$ is the magnitude of the relative speed q of the stationary reflection point on the x-y plane. $Cm_h$ is the magnitude of the moving body speed Cm on the x-y plane. $\gamma_h$ is a horizontal moving body speed error that is the magnitude of the moving body speed error $\gamma$ on the x-y plane.

Next, at S60, the signal processing unit 4 determines whether the vertical axial misalignment angle $\alpha_v$ estimated at S50 is adjustable by the mounting angle adjustment apparatus 7. When the vertical axial misalignment angle $\alpha_v$ is within an adjustable range that is set in advance, the signal processing unit 4 determines that axial misalignment adjustment can be performed.

In addition, in a similar manner, the signal processing unit 4 determines whether the horizontal axial misalignment angle $\alpha_h$ estimated at S50 is adjustable by the mounting angle adjustment apparatus 7. When the horizontal axial misalignment angle $\alpha_h$ is within an adjustable range that is set in advance, the signal processing unit 4 determines that axial misalignment adjustment can be performed. When determined that axial misalignment adjustment can be performed, the signal processing unit 4 proceeds to S70. When determined that axial misalignment adjustment cannot be performed, the signal processing unit 4 proceeds to S90.

At S70, the signal processing unit 4 outputs a drive signal to the mounting angle adjustment apparatus 7. The drive signal is a signal for rotating the radar apparatus 2 around an axis along a front/rear direction of the own vehicle VH by an amount amounting to the vertical axial misalignment angle $\alpha_v$ in the vertical direction and an amount amounting to the horizontal axial misalignment angle $\alpha_h$ in the horizontal direction. According to the present embodiment, as a result, a radar mounting angle is adjusted such that the reference direction A of the radar apparatus 2 coincides with the advancing direction B of the own vehicle VH.

Next, at S80, the signal processing unit 4 calculates a vertical angle $Ver_{cor}$ that is the vertical angle Ver corrected by an amount amounting to the vertical axial misalignment angle $\alpha_v$. In addition, the signal processing unit 4 calculates a horizontal angle $Hor_{cor}$ that is the horizontal angle Hor corrected by an amount amounting to the horizontal axial misalignment angle $\alpha_h$. The signal processing unit 4 performs the above-described target recognition process based on the corrected vertical angle $Ver_{cor}$ and the corrected horizontal angle $Hor_{cor}$. The signal processing unit 4 then ends the axial misalignment adjustment process.

At S90, the signal processing unit 4 outputs, to an apparatus outside the signal processing unit 4, an axial misalignment diagnosis that is diagnostic information indicating that axial misalignment has occurred in the radar apparatus 2. For example, the external apparatus may be the axial misalignment notification apparatus 6. Then, the signal processing unit 4 ends the axial misalignment estimation process.

3. Effects

According to the present embodiment described in detail above, following effects are achieved.

(3a) The signal processing unit 4 extracts a reflection point that is assumed to be a point of reflection by a stationary object as the stationary reflection point, among the reflection points detected by the radar apparatus 2, based on a predetermined extraction condition. In addition, the signal processing unit 4 is configured to determine whether aliasing is present at the orientation angle of the stationary reflection point for each stationary reflection point, correct the orientation angle of the stationary reflection point in which aliasing is determined to be present at the orientation angle, and estimate the axial misalignment angle based on the corrected orientation angle.

Consequently, according to the present embodiment, because the signal processing unit 4 estimates the axial misalignment angle taking into consideration aliasing being present at the orientation angle of the extracted stationary reflection point, estimation accuracy regarding the axial misalignment angle can be improved.

(3b) When axial misalignment occurs in the radar apparatus 2, shifting that corresponds to the axial misalignment also occurs in the measurement angle range RA. Therefore, when the signal processing unit 4 determines whether aliasing is present at the orientation angle of the stationary reflection point without taking into consideration axial misalignment, the signal processing unit 4 may erroneously determine that aliasing is not present regardless of aliasing actually being present. In addition, when the signal processing unit 4 determines whether aliasing is present at the orientation angle of the stationary reflection point without taking into consideration axial misalignment, the signal processing unit 4 may erroneously determine that aliasing is present regardless of aliasing actually not being present.

The signal processing unit 4 determines whether aliasing is present at the orientation angle of the stationary reflection point for each stationary reflection point using the orientation angle calculated based on the axial misalignment angles estimated at measurement cycles up to the previous measurement cycle.

Consequently, according to the present embodiment, when determining whether aliasing is present at the orientation angle of the stationary reflection point, the signal processing unit 4 can avoid erroneous determination and make an accurate determination. Furthermore, the signal processing unit 4 can improve estimation accuracy regarding the axial misalignment angle.

(3c) The signal processing unit 4 calculates the first difference $d_1$ that is the difference between the first estimated speed ratio $V_{obs\_est}$ and the observed speed ratio $V_{obs}$, and the plurality of second differences d2 between the plurality of second estimated speed ratios $V_{fold}$ and the observed speed ratio $V_{obs}$ for each stationary reflection point. If even a single value that is less than the first difference $d_1$ is present among the plurality of second differences d2, the signal processing unit 4 determines that aliasing is present at the orientation angle of the stationary reflection point.

Here, the principle of determining whether aliasing is present at the orientation angle of the stationary reflection point based on the first difference d1 and the second differences d2 will be described with reference to FIG. 12. Here, an example in which whether aliasing is present at the vertical angle Ver is determined will be described. Here, this similarly applies to when whether aliasing is present at the horizontal angle Hor is determined.

A stationary reflection point 103 is extracted based on the curved line 101 that is the ideal curved line when axial misalignment is not taken into consideration. A point 104 that is plotted when aliasing is present at the vertical angle Ver of the stationary reflection point 103 is presumed. The point 104 is plotted in a position that is shifted from the stationary reflection point 103 by an amount amounting to the vertical aliasing angle vFOV. That is, in a coordinate system shown in FIG. 12, a value on the horizontal axis of the stationary reflection point 103 is the vertical angle Ver and a value on the horizontal axis of the point 104 is the vertical aliasing orientation angle $Ver_{fold}$. In addition, in the coordinate system shown in FIG. 12, a value $h_0$ on the vertical axis of the stationary reflection point 103 and the point 104 is the observed speed ratio $V_{obs}$.

As described above, when axial misalignment occurs in the radar apparatus 2, the point of reflection by a stationary object is plotted on the curved line 102 that is the curved line in which the curved line 101 is moved in parallel in the horizontal axis direction by an amount amounting to the vertical axial misalignment angle $α_v$. That is, the ideal curved line when axial misalignment is taken into consideration is the curved line 102. On the curved line 102, a value $h_1$ on the vertical axis of a point that corresponds to the vertical angle Ver is the first estimated speed ratio $V_{obs}$_est. In addition, on the curved line 102, a value $h_2$ on the vertical axis of a point that corresponds to the vertical aliasing orientation angle $Ver_{fold}$ is the vertical second estimated speed ratio $V_{v\_fold}$.

In this case, the first difference $d_1$ is an absolute value of a difference between $h_1$ and $h_0$, and the vertical second difference $d_{v\_2}$ is an absolute value of a difference between $h_2$ and $h_0$. Here, the vertical second difference $d_{v\_2}$ being a smaller value than the first difference $d_1$ means that the point 104 in which aliasing is presumed to be present is closer to the curved line 102 that is the ideal curved line when axial misalignment is taken into consideration, than the stationary reflection point 103 is. In other words, the point 104 in which aliasing is presumed to be present has a higher likelihood of being the point of reflection by a stationary object than the stationary reflection point 103.

Consequently, according to the present embodiment, whether aliasing is present at the orientation angle of the stationary reflection point can be determined through use of a property in which the speed ratio $-q/Cm$ of the point of reflection by a stationary object is dependent on the orientation angle of the point of reflection by a stationary object. Furthermore, estimation accuracy regarding the axial misalignment angle can be improved.

(3d) The signal processing unit 4 does not use the stationary reflection point of which all of the first difference $d_1$ and the plurality of second differences $d_2$ are equal to or greater than the not-used stationary reflection point threshold in the estimation of the axial misalignment angle.

Figure 12:
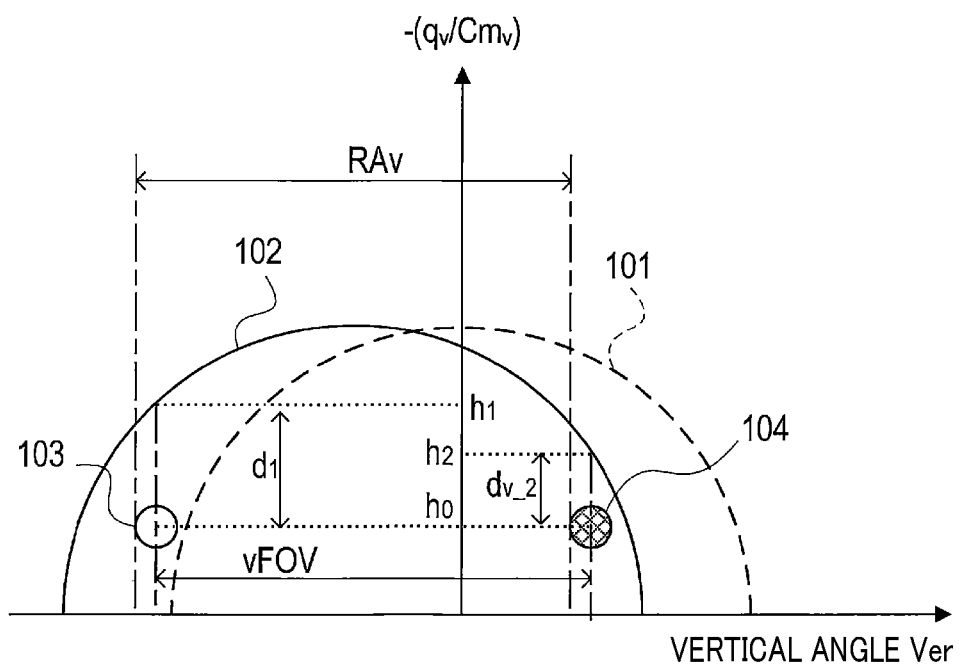
FIG. 12 is an explanatory diagram for explaining a principle of determining presence of aliasing.

All of the first difference $d_1$ and the plurality of second differences $d_2$ being equal to or greater than the not-used stationary reflection point threshold means that, in the coordinate system shown in FIG. 12, deviation is present between the stationary reflection point 103 and the ideal curved line 102 when axial misalignment is taken into consideration. In addition, deviation is also present between the point 104 in which aliasing is presumed to be present at the orientation angle of the stationary reflection point 103 and the ideal curved line 102 when axial misalignment is taken into consideration.

That is, the acquired reflection point that is extracted as the point of reflection by a stationary object in a state in which the axial misalignment angles estimated at measurement cycles up to the previous measurement cycle are not taken into consideration is present in a position away from the ideal curved line when axial misalignment is taken into consideration. In addition, the point in which aliasing is presumed to be present at the orientation angle of the acquired reflection point is also present in a position away from the ideal curved line when axial misalignment is taken into consideration. Therefore, a likelihood of the acquired reflection point being the point of reflection by a stationary object is low.

Consequently, according to the present embodiment, an acquired reflection point that has a low likelihood of being a point of reflection by a stationary object can be prevented from being used in the estimation of the axial misalignment angle. Furthermore, estimation accuracy regarding the axial misalignment angle can be improved.

(3e) The not-used stationary reflection point threshold is set for each stationary reflection point so as to decrease as the absolute value of the orientation angle of the stationary reflection point increases.

In the radar apparatus 2, an orientation at which detection accuracy regarding the reflection point information is high and an orientation at which detection accuracy regarding the reflection point information is low may occur. Detection accuracy regarding relative speed increases as the stationary reflection point is present in a position closer to the center axis of the irradiation range of the radar waves. Detection accuracy regarding relative speed decreases as the stationary reflection point is present in a position farther from the center axis of the irradiation range of the radar waves. That is, the detection accuracy regarding relative speed decreases as the absolute value of the orientation angle of the stationary reflection point increases. Therefore, a likelihood of a detection error occurring in the detected relative speed is considered high Consequently, according to the present embodiment, as a result of the not-used stationary reflection point threshold of a stationary reflection point that has an orientation angle of which the absolute value is large being set to be small, a stationary reflection point that is considered to have a high likelihood of a detection error occurring in the detected relative speed can be prevented from being used in the estimation of the axial misalignment angle. Furthermore, estimation accuracy regarding the axial misalignment angle can be improved.

(3f) When determined that the minimum differences as a whole are trending towards increase, the signal processing unit 4 estimates the axial misalignment angle based on the orientation angle of the stationary reflection point that is not corrected.

The minimum differences as a whole trending towards increase means that deviation has occurred between the population that is configured by all stationary reflection points and the ideal curved line when axial misalignment is taken into consideration. As a cause of the deviation, a likelihood of a previous axial misalignment angle not being appropriate and reliability of the ideal curved line when axial misalignment is taken into consideration decreasing can be considered. Therefore, in this case, reliability of a determination result determining whether aliasing is present at the orientation angle of the stationary reflection point is also considered to be low based on the ideal curved line when axial misalignment is taken into consideration.

Consequently, according to the present embodiment, when reliability of the ideal curved line when axial misalignment is taken into consideration is low, the determination result determining whether aliasing is present at the orientation angle of the stationary reflection point can be prevented from being used for estimation of the axial misalignment angle. Furthermore, estimation accuracy regarding the axial misalignment angle can be improved.

(3g) When the moving body speed Cm is low, an error tends to occur in the calculated observed speed ratio $V_{obs}$. In addition, because the absolute value of the difference is calculated based on the observed speed ratio $V_{obs}$, when the moving body speed Cm is low, it can be said that an error tends to occur in the absolute value of the calculated difference as well. Therefore, the signal processing unit 4 may make an erroneous determination when determining whether aliasing is present at the orientation angle of the stationary reflection point, when the moving body speed Cm is low.

According to the present embodiment, when the moving body speed Cm is lower than the predetermined moving body threshold, the signal processing unit 4 estimates the axial misalignment angle based on the orientation angle of the stationary reflection point that is not corrected by the aliasing processing unit. That is, when the moving body speed Cm is less than the moving body threshold, the signal processing unit 4 does not perform the aliasing process and estimates the axial misalignment angle based on the orientation angle of the stationary reflection point.

Consequently, according to the present embodiment, a result that is erroneously determined regarding the determination of whether aliasing is present at the orientation angle of the stationary reflection point can be prevented from being used for estimation of the axial misalignment angle. Furthermore, estimation accuracy regarding the axial misalignment angle can be improved.

(3h) The signal processing unit 4 corrects the orientation angle by a correction amount that is less than an amount when corrected by the previous axial misalignment angle, and calculates the first estimated speed ratio $V_{obs\_est}$ using the corrected orientation angle.

Even when reliability of the estimation of the axial misalignment angle is low such as immediately after start of measurement, as a result of the orientation angle being corrected by a correction amount that is less than the amount when corrected by the axial misalignment angle, the signal processing unit 4 can correct the orientation angle while reducing effects due to low reliability of the estimation value of the axial misalignment angle.

Consequently, according to the present embodiment, in correction of the orientation angle of the stationary reflection point, correction can be made while the effect of reliability of the estimation of the axial misalignment angle is reduced compared to when the correction is made by the axial misalignment angle. Furthermore, estimation accuracy regarding the axial misalignment angle can be improved.

4. Other Embodiments

An embodiment of the present disclosure is described above. However, it goes without saying that the present disclosure is not limited to the above-described embodiment and various embodiments are possible.

(4a) According to the above-described embodiment, at S402, the signal processing unit 4 calculates the forgetting factor k based on expression (5). However, the disclosed expression (5) is only an example. The forgetting factor k is not limited thereto. For example, the forgetting factor k may be k=1.

(4b) According to the above-described embodiment, at S404, the signal processing unit 4 calculates the vertical aliasing orientation angle $Ver_{fold}$ and the horizontal aliasing orientation angle $Hor_{fold}$ as the aliasing orientation angle. However, the aliasing orientation angle calculated by the signal processing unit 4 is not limited thereto. For example, the signal processing unit 4 may calculate only either of the vertical aliasing orientation angle $Ver_{fold}$ and the horizontal aliasing orientation angle $Hor_{fold}$.

(4c) According to the above-described embodiment, at S405, the signal processing unit 4 calculates the vertical second estimated speed ratio $V_{v\_fold}$, the horizontal second estimated speed ratio $V_{h\_fold}$, and the vertical-horizontal second estimated speed ratio $V_{vh\_fold}$ as the second estimated speed ratio $V_{fold}$. However, the calculated second estimated speed ratio $V_{fold}$ is not limited thereto. For example, the signal processing unit 4 may calculate one or two of the vertical second estimated speed ratio $V_{v\_fold}$, the horizontal second estimated speed ratio $V_{h\_fold}$, and the vertical-horizontal second estimated speed ratio $V_{vh\_fold}$ as the second estimated speed ratio.

(4d) According to the above-described embodiment, at S409, the signal processing unit 4 determines whether the minimum difference is equal to or greater than the predetermined not-used stationary reflection point threshold. However, a target of determination by the signal processing unit 4 is not limited thereto. For example, the signal processing unit 4 may determine whether each of the absolute values of all differences calculate at S406 is equal to or greater than the not-used stationary reflection point threshold. In this case, a stationary reflection point of which the absolute values of all differences are determined to be equal to or greater than the not-used stationary reflection point threshold is the not-used stationary reflection point, and a stationary reflection point of which even one absolute value of the differences is determined not to be equal to or greater than the not-used stationary reflection point threshold is the to-be-used stationary reflection point.

(4e) According to the above-described embodiment, at S50, the signal processing unit 4 performs the axial misalignment angle estimation process for estimating the axial misalignment angle using the orientation angle of the to-be-used stationary reflection point. However, estimation of the axial misalignment angle is not limited thereto. For example, the signal processing unit 4 may estimate the axial misalignment angle using the orientation angles of all stationary reflection points. In this case, differentiation between the not-used stationary reflection points and the to-be-used stationary reflection points is not required. Therefore, the signal processing unit 4 does not perform the process to differentiate between the not-used stationary reflection points and the to-be-used stationary reflection points at S409. That is, the process at S409 is not performed.

(4f) According to the above-described embodiment, at S411, the signal processing unit 4 determines whether the population satisfies the predetermined correction cancelation condition, with all stationary reflection points as the population. However, the population is not limited thereto. For example, the signal processing unit 4 may determine whether the population satisfies the predetermined correction cancelation condition, with all to-be-used stationary reflection points as the population. In other words, the signal processing unit 4 may determine whether the population satisfies the predetermined correction cancelation condition without including the not-used stationary reflection points that are acquired reflection points of which the likelihood of the reflection point being a point of reflection by a stationary object is low in the population.

(4g) According to the above-described embodiment, the difference threshold is less than the not-used stationary reflection point threshold. However, the values of the difference threshold and the not-used stationary reflection point threshold are not limited thereto. For example, the difference threshold may be equal to or greater than the not-used stationary reflection point threshold.

(4h) According to the present embodiment, when determined that the population satisfies the predetermined correction cancelation condition at S411, at S412, the signal processing unit 4 cancels the correction of the orientation angles of all stationary reflection points of which the orientation angle is corrected at S408. However, the process performed by the signal processing unit 4 is not limited thereto. For example, the signal processing unit 4 may not perform the processes at S411 and S412. In this case, when determined that the processes at S402 to S409 are performed for all stationary reflection points at S410, the signal processing unit 4 ends the aliasing process.

(4i) According to the above-described embodiment, the signal processing unit 4 calculates the observed speed ratio $V_{obs}$ by expression (1). However, the disclosed expression (1) is an example. The observed speed ratio $V_{obs}$ is not limited thereto. For example, the signal processing unit 4 may calculate the observed speed ratio $V_{obs}$ by expression (21), based on the relative speed q and a value obtained by the moving body speed Cm being corrected by the moving body speed error correction value $\gamma_{cor}$. In this case, the signal processing unit 4 calculates the moving body speed error correction value $\gamma_{cor}$ by expression (22), based on the moving body speed error γ estimated at S50 in the previous measurement cycle and the forgetting factor k.

$$V_{obs} = -\frac{q}{Cm \times \gamma_{cor}} \quad (21)$$

$$\gamma_{cor} = 1 + (\gamma - 1) \times k \quad (22)$$

(4j) According to the above-described embodiment, the signal processing unit 4 calculates the estimated speed ratio $V_{est}$ by expression (2). However, the disclosed expression (2) is an example. The estimated speed ratio $V_{est}$ is not limited thereto. For example, the signal processing unit 4 may calculate the estimated speed ratio $V_{est}$ by expression (23), based on values obtained by the vertical angle Ver being corrected by the vertical axial misalignment correction value $\beta_v$ calculated by expression (4) and the horizontal angle Hor being corrected by the horizontal axial misalignment correction value $\beta_h$ calculated by expression (6).

$$V_{obs\_est} = \sqrt{1 - (\sin(Ver + \beta_v))^2 - (\sin(Hor + \beta_h))^2} \quad (23)$$

(4k) According to the above-described embodiment, a configuration is described in which the radar apparatus 2 irradiates the radar waves towards the irradiation range that is a predetermined angular range ahead of the own vehicle VH. However, the irradiation range is not limited to ahead of the own vehicle VH. For example, the irradiation range may be at least any one of ahead, ahead and to the right, ahead and to the left, behind, behind and to the right, behind and to the left, to the right, and to the left of the own vehicle VH.

(4l) According to the above-described embodiment, the radar apparatus 2 is mounted to the own vehicle VH such that the reference direction A of the radar apparatus 2 coincides with the reference direction of the vehicle. However, the mounting of the radar apparatus 2 in the own vehicle VH is not limited thereto. For example, the radar apparatus 2 may be mounted such that the reference direction A of the radar apparatus 2 is a direction that is shifted in at least one of the vertical direction and the horizontal direction from the reference direction of the vehicle. That is, when the advancing direction B of the own vehicle VH is the reference direction of the vehicle, the radar apparatus 2 may be mounted to the own vehicle VH in a state in which the reference direction A of the radar apparatus 2 and the advancing direction B of the own vehicle VH do not coincide.

In this case, axial misalignment occurs in the radar apparatus 2 at a stage when the radar apparatus 2 is mounted to the own vehicle VH. In other words, the radar apparatus 2 is mounted to the own vehicle VH in a state in which axial misalignment occurs in the radar apparatus 2.

As a result of axial misalignment being deliberately made to occur in the radar apparatus 2, the measurement angle range RA is intentionally shifted and, further, aliasing can be intentionally made to occur at the orientation angle of the stationary reflection point. Consequently, the signal processing unit 4 can accurately perform the aliasing process and the axial misalignment angle estimation process.

(4m) According to the above-described embodiment, an example in which the radar apparatus 2 uses the FMCW system is described. However, a radar system of the radar apparatus 2 is not limited to FMCW. For example, the radar apparatus 2 may be configured to use two-frequency CW, FCM, or pulses. FCM is an abbreviation of Fast Chirp Modulation.

(4n) According to the above-described embodiment, an example in which the signal processing unit 4 performs the axial misalignment adjustment process is described. However, the configuration may be such that the radar apparatus 2 performs the axial misalignment adjustment process.

(4o) According to the above-described embodiment, the audio output apparatus that is set in the vehicle cabin is used as the axial misalignment notification apparatus 6. However, the axial misalignment notification apparatus 6 is not limited thereto. For example, audio equipment provided in the assistance executing unit 5 or the like may be used as the notification apparatus 6.

(4p) A function provided by a single constituent element according to the above-described embodiments may be dispersed as a plurality of constituent elements. Functions provided by a plurality of constituent elements may be integrated into a single constituent element. In addition, a part of a configuration according to the above-described embodiments may be omitted. Furthermore, at least a part of a configuration according to the above-described embodiments may be added to or replace a configuration of another of the above-described embodiments.

(4q) The present disclosure can also be actualized by various modes in addition to the above-described axial misalignment estimation apparatus, such as the vehicle control system 1 that includes the axial misalignment estimation apparatus, a program for enabling a computer to function as the axial misalignment estimation apparatus, a medium that records the program therein, and an axial misalignment estimation method.

Here, according to the above-described embodiment, the signal processing unit 4 corresponds to an axial misalignment estimation apparatus. In addition, S10 corresponds to a process as a reflection point information acquiring unit. S20 corresponds to a process as a moving body speed acquiring unit. S30 corresponds to a process as an extracting unit. S40 corresponds to a process as an aliasing processing unit. S50 corresponds to a process as an axial misalignment estimating unit. Furthermore, the own vehicle VH corresponds to a moving body.

What is claimed is:

1. An axial misalignment estimation apparatus that estimates an axial misalignment angle of a radar apparatus that is mounted to a moving body, the axial misalignment estimation apparatus comprising:
   a reflection point information acquiring unit that is configured to acquire, for each reflection point detected by the radar apparatus, a relative speed of the reflection point relative to the radar apparatus and an orientation angle of the reflection point with reference to a direction that is prescribed based on design as a reference of the radar apparatus, at every measurement cycle set in advance;
   a moving body speed acquiring unit that is configured to acquire a moving body speed that is a speed of the moving body, at every measurement cycle;
   an extracting unit that is configured to extract, as a stationary reflection point, a reflection point that is assumed to be a point of reflection by a stationary object based on a predetermined extraction condition, among the reflection points detected by the radar apparatus;
   an aliasing processing unit that is configured to determine whether aliasing is present at the orientation angle of the stationary reflection point and correct the orientation angle of the stationary reflection point in which aliasing is determined to be present; and
   an axial misalignment estimating unit that is configured to estimate the axial misalignment angle based on the orientation angle of the stationary reflection point, wherein:
   the extraction condition is prescribed based on a relational expression that is established between an observed speed ratio that is a ratio of the relative speed of the reflection point and the moving body speed, and an estimated speed ratio that is the observed speed ratio estimated based on the orientation angle of the reflection point in a case where the reflection point is a point of reflection by a stationary object;
   the aliasing processing unit is configured to determine, for each stationary reflection point, whether aliasing is present at the orientation angle of the stationary reflection point based on a first estimated speed ratio that is the estimated speed ratio calculated using the orientation angle that is corrected based on the axial misalignment angle estimated at the measurement cycles up to a previous measurement cycle, and at least one second estimated speed ratio that is the first estimated speed ratio presuming that aliasing is present at the orientation angle; and
   the axial misalignment estimating unit is configured to estimate the axial misalignment angle based on the corrected orientation angle for the stationary reflection point of which the orientation angle is corrected by the aliasing processing unit.

2. The axial misalignment estimation apparatus according to claim 1, wherein:
   the aliasing processing unit is configured to
   calculate, for each stationary reflection point, a first difference that is an absolute value of a difference between the first estimated speed ratio and the observed speed ratio, and at least one second difference that is an absolute value of a difference between the at least one second estimated speed ratio and the observed speed ratio, and
   determine that aliasing is present at the orientation angle of the stationary reflection point in response to even a single value that is less than the first difference being present among the at least one second difference.

3. The axial misalignment estimation apparatus according to claim 2, wherein:
   the axial misalignment estimating unit is configured to not use the stationary reflection point in which all of the first difference and the at least one second difference are equal to or greater than a predetermined not-used stationary reflection point threshold, in the estimation of the axial misalignment angle.

4. The axial misalignment estimation apparatus according to claim 3, wherein:
   the not-used stationary reflection point threshold is configured to be set for each stationary reflection point so as to decrease as an absolute value of the orientation angle of the stationary reflection point increases.

5. The axial misalignment estimation apparatus according to claim 4, wherein:
   the axial misalignment estimating unit is configured to estimate the axial misalignment angle based on the orientation angle of the stationary reflection point that is not corrected by the aliasing processing unit, in response to being determined that the differences calculated by the aliasing processing unit as a whole are trending towards increase.

6. The axial misalignment estimation apparatus according to claim 5, wherein:
   the axial misalignment estimating unit is configured to estimate the axial misalignment angle based on the orientation angle of the stationary reflection point that is not corrected by the aliasing processing unit, in response to the moving body speed acquired by the moving body speed acquiring unit being less than a predetermined moving body threshold.

7. The axial misalignment estimation apparatus according to claim 6, wherein:
   the first estimated speed ratio is calculated using the orientation angle that is corrected, the orientation angle being corrected by a correction amount that is less than that when corrected by the axial misalignment angle estimated in the measurement cycles up to the previous measurement cycle.

8. The axial misalignment estimation apparatus according to claim 7, wherein:
   the radar apparatus is mounted to a state in which axial misalignment occurs in at least either of a vertical direction and a horizontal direction.

9. The axial misalignment estimation apparatus according to claim 2, wherein:
   the axial misalignment estimating unit is configured to estimate the axial misalignment angle based on the orientation angle of the stationary reflection point that is not corrected by the aliasing processing unit, in response to being determined that the differences calculated by the aliasing processing unit as a whole are trending towards increase.

10. The axial misalignment estimation apparatus according to claim 1, wherein:
    the axial misalignment estimating unit is configured to estimate the axial misalignment angle based on the orientation angle of the stationary reflection point that is not corrected by the aliasing processing unit, in response to the moving body speed acquired by the moving body speed acquiring unit being less than a predetermined moving body threshold.

11. The axial misalignment estimation apparatus according to claim 1, wherein:
the first estimated speed ratio is calculated using the orientation angle that is corrected, the orientation angle being corrected by a correction amount that is less than that when corrected by the axial misalignment angle estimated in the measurement cycles up to the previous measurement cycle.

12. The axial misalignment estimation apparatus according to claim 1, wherein:
the radar apparatus is mounted to a state in which axial misalignment occurs in at least either of a vertical direction and a horizontal direction.

* * * * *